June 21, 1960 E. G. WISE ET AL 2,941,274
APPARATUS FOR AUTOMATICALLY PRODUCING
CEMENT BLOCKS AND THE LIKE
Filed Oct. 29, 1957 3 Sheets-Sheet 3
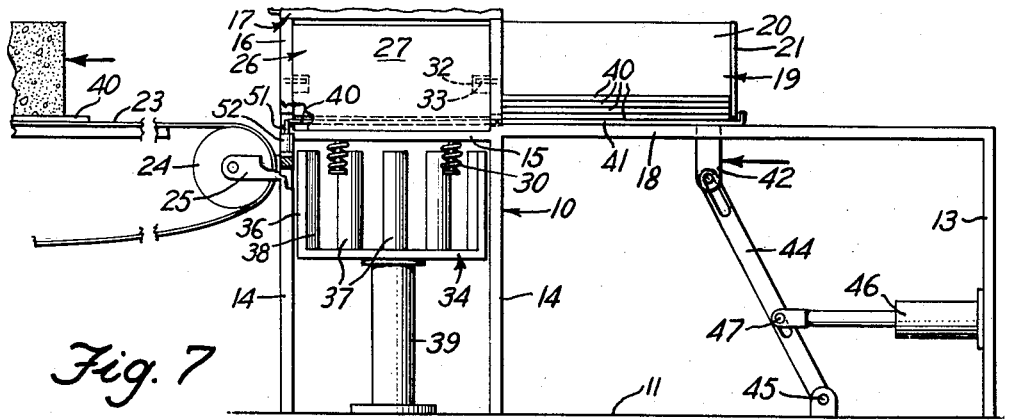
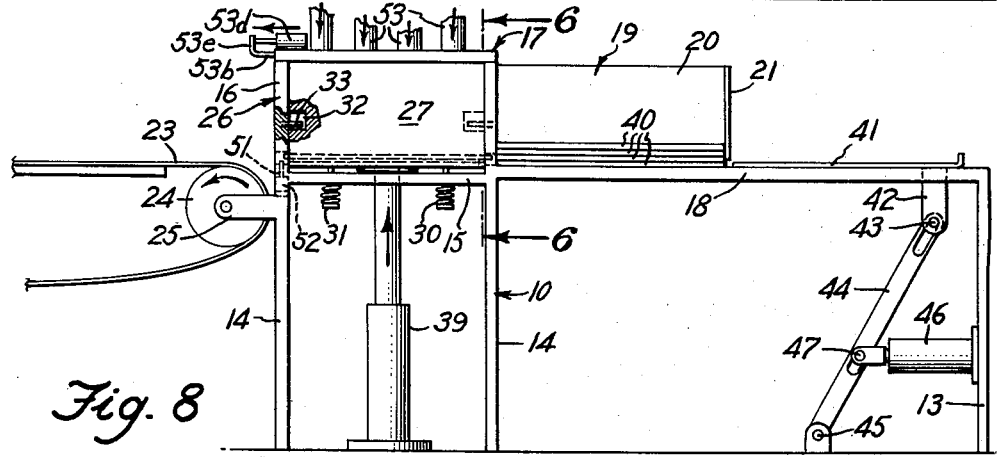
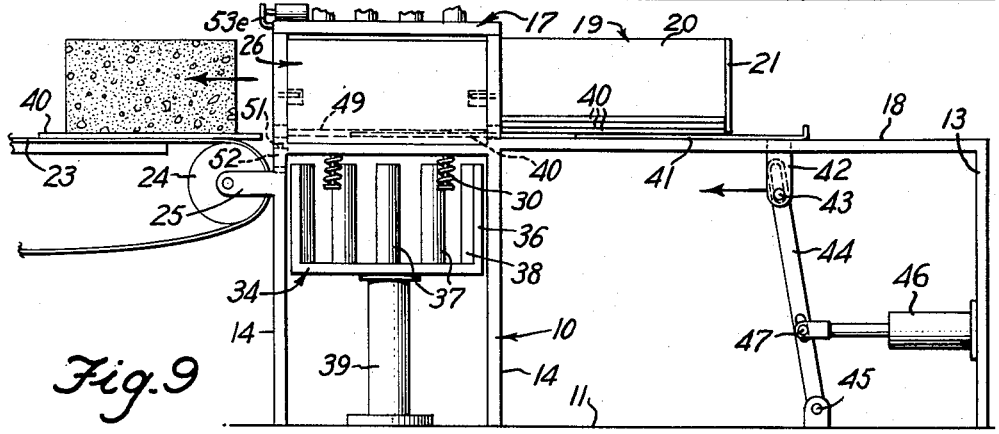
INVENTORS
**ERNEST G. WISE
ANTHONY CASBONI**
BY
ATTORNEY

United States Patent Office
2,941,274
Patented June 21, 1960

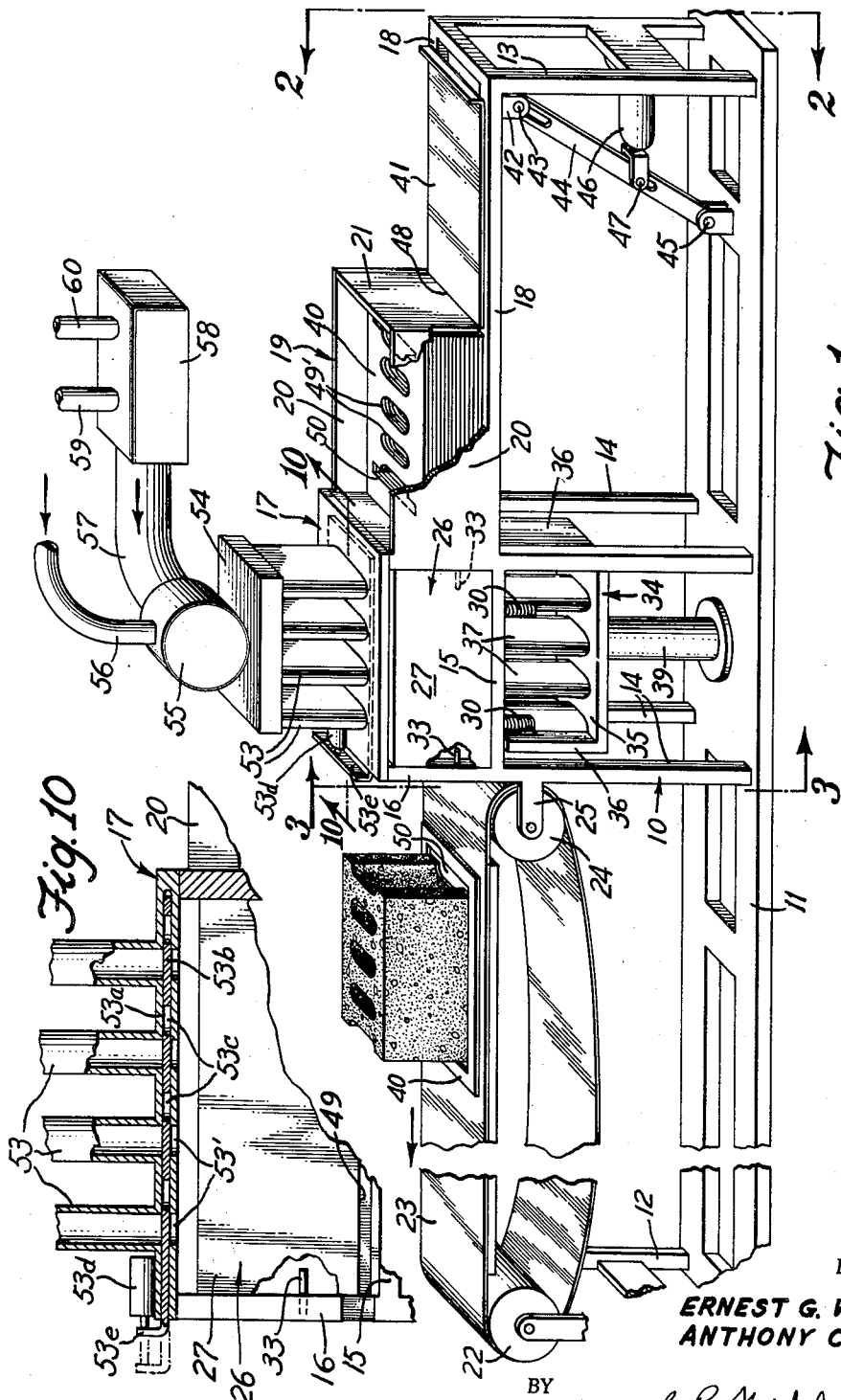

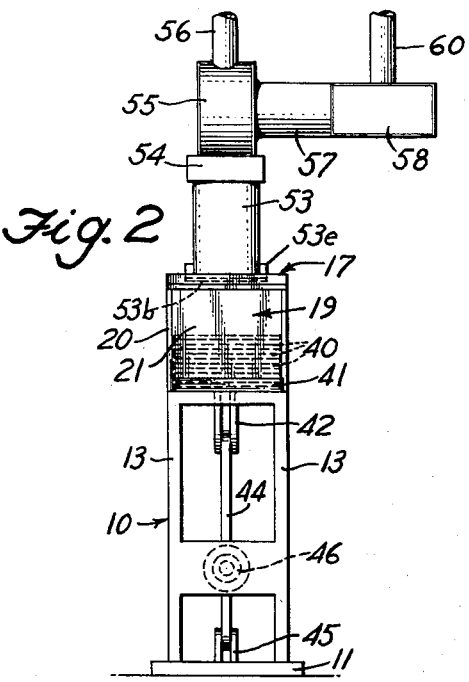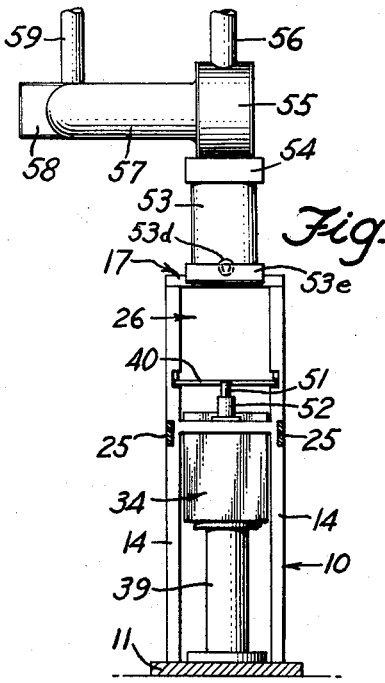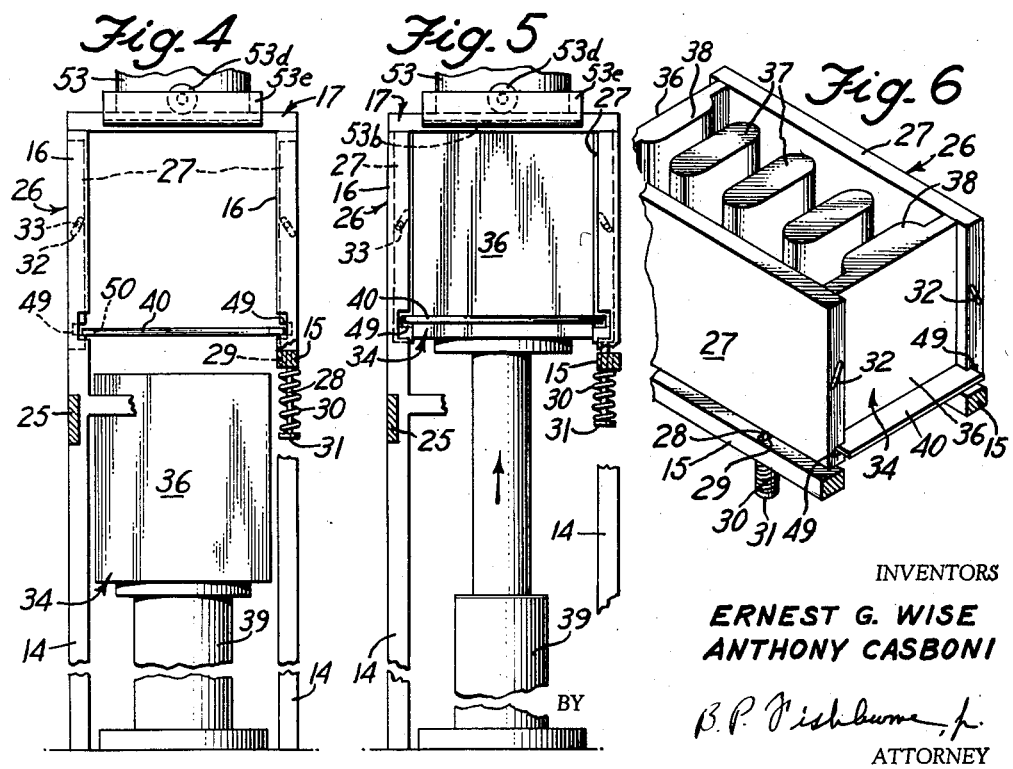

2,941,274

APPARATUS FOR AUTOMATICALLY PRODUCING CEMENT BLOCKS AND THE LIKE

Ernest G. Wise and Anthony Casboni, both of 9901 Longwood Drive, Chicago 43, Ill.

Filed Oct. 29, 1957, Ser. No. 693,125

5 Claims. (Cl. 25—41)

The present invention relates to an apparatus for automatically producing cement building blocks and the like.

A primary object of the invention is to provide an apparatus for the continuous and automatic manufacturing of cement building blocks and the like, with the absolute minimum of physical labor.

Another important object of the invention is to provide an apparatus of the above-mentioned character embodying pressure injection molding means for the cement or other moldable material utilized in the making of the blocks.

A further object of the invention is to provide an apparatus of the above-mentioned character for making the building blocks in a continuous and rapid manner, and in substantially any desired shape, substantially without the need for any manual labor, except the starting and stopping of the machine and the general supervision of its operation.

A further object of the invention is to provide an automatic apparatus of the above-mentioned character, the use of which will entirely eliminate the usual racking and handling labor employed in the making of building blocks at the present time.

Still another object of the invention is to provide an apparatus of the above-mentioned character which is reliable and efficient for producing extremely high grade cement building blocks and the like, the apparatus being highly simplified, rugged and durable, and relatively inexpensive to build.

Other objects and advantages of the invention will become apparent during the course of the following description.

In the accompanying drawings, forming a part of this application, and in which like numerals are employed to designate like parts throughout the same, Figure 1 is a perspective view of cement block making apparatus.

Figure 2 is an end elevation of the apparatus taken substantially on line 2—2 of Figure 1.

Figure 3 is a transverse vertical section taken on line 3—3 of Figure 1.

Figure 4 is an enlarged fragmentary view similar to Figure 3 and showing the apparatus in a non-molding position.

Figure 5 is a further view similar to Figure 4 showing the apparatus in a molding position.

Figure 6 is a fragmentary perspective view of a mold box and core with the injection molding head removed for the purpose of illustration.

Figure 7 is a side elevation of the apparatus, partly diagrammatic.

Figure 8 is a further side elevation of the apparatus, partly diagrammatic.

Figure 9 is a further side elevation of the apparatus, partly diagrammatic.

Figure 10 is an enlarged fragmentary vertical section taken on line 10—10 of Figure 1.

In the drawings, wherein for the purpose of illustration is shown a preferred embodiment of the invention, attention is directed first to Figures 1 through 6, wherein the numeral 10 designates generally a frame or support, including a horizontal base 11 and end upright frame members 12 and 13, rigid therewith. Intermediate uprights or legs 14 are rigidly secured to the base 11 and extend vertically above the same, to form a support or table for the mold box portion of the apparatus, to be described. The legs 14 are rigidly connected a substantial distance above the base 11 by a pair of horizontal longitudinal bars 15, and the legs 14 extend above the bars 15 for substantial distances, as at 16, to form a rigid support for a horizontal injection molding head shown generally at 17 in Figure 1.

The frame 10 further embodies a pair of horizontal longitudinal rails 18, extending between the end upright 13 and the adjacent pair of legs 14, and rigid therewith. A rectangular box-like pallet rack 19, including side walls 20 and an outer end wall 21, is fixedly mounted upon the horizontal rails 18, adjacent to the intake end of the mold box to be described.

A first roller 22 of a horizontal endless conveyor belt 23 is journaled upon the top of the end upright frame member 12, and a second conveyor belt roller 24 is similarly journaled upon short arms 25, rigidly secured to the adjacent pair of legs 14 as shown in Figure 1. The upper run of the horizontal conveyor belt 23 is at substantially the same elevation as the tops of the horizontal rails 18. The horizontal frame bars 15 are likewise preferably at the same elevation as the rails 18. Power is applied to the conveyor belt roller 22 by conventional means, not shown, during the operation of the apparatus to cause the upper run of the belt to travel in the direction of the arrow in Figure 1, or away from the molding means.

A mold box shown generally at 26 is provided, and the mold box is open at its opposite ends and at its bottom, its top being closed or covered by the horizontal injection molding head 17. The mold box 26 embodies a pair of vertical sides 27, arranged between the pairs of legs 14 at opposite sides of the apparatus, and directly above the horizontal frame bars 15. The mold box sides 27 carry depending vertical rods 28, rigid therewith, engaging slidably through openings 29 formed in the frame bars 15. Compressible coil springs 30 surround the rods 28 and have their opposite ends engaging the bottoms of the bars 15 and heads 31 carried by the lower ends of the rods 28, as shown. The springs 30 serve to yieldably hold the mold box sides 27 downwardly toward engagement with frame bars 15. The mold box sides 27 are held against endwise movement by the upper extensions 16 of the vertical legs 14.

The mold box sides 27 are provided in their opposite ends with inclined or diagonal slots 32, slidably receiving horizontal rods or pins 33, rigid with the leg extensions 16. The mold box sides 27 are thus mounted for limited vertical movement relative to the frame bars 15, and also for limited lateral movement toward and from each other, as will be further described. The openings 29 for the rods 28 are sufficiently large to permit the desired lateral movement of the mold box sides 27, during the operation of the apparatus. When the mold box sides 27 are in their lowermost positions, their upper edges are spaced slightly below the fixed injection molding head 17, as shown.

A mold core shown generally at 34 is provided, and includes a bottom wall 35 and vertical end walls 36, rigid therewith. The sides of the mold core are open as shown in the drawings, and its top is open. The mold core 34 further comprises a desired number of spaced upstanding core sections 37 of preferred shape, rigidly secured to the bottom wall 35. Core formations or parts 38 are integrally formed upon the end walls 36 of the mold core, as shown. The shapes of the core parts 37 and 38 may be varied, as found desirable, and the number and arrangement of the core parts may be varied, as desired. In this connection, it is desired to state that we do not wish to limit the invention to a particular design or shape of building block, and it is within the scope of this invention to produce blocks of various designs or shapes by using mold boxes and cores of correspondingly varied design. Likewise, the invention is not limited to the making of cement building blocks, but is intended to encompass the manufacturing of building blocks and the like from various types of moldable materials, including certain plastics materials.

The width of the mold core 35 is such that it may readily enter between the sides 27 of the mold box 26 when elevated. When the mold core is elevated, Figures 5 and 6, the end walls 36 of the mold core close the normally open ends of the mold box 26. The top of the mold core 34 is then flush with the upper edges of the mold box sides 27, as shown.

An extensible pneumatic or hydraulic cylinder 39 is rigidly mounted upon the base 11, beneath the mold core 34 and connected with the bottom wall 35 for raising and lowering the mold core. The cylinder means 39 may be of conventional construction, and need not be described in detail in this application.

Means are provided to successively feed the lowermost pallet of a stack of pallets 40 contained within the rack 19 into the mold box 26. This means comprises a horizontal reciprocatory pallet pusher plate 41, slidably mounted upon the horizontal rails 18 outwardly of the pallet rack 19. The pusher plate 41 carries a pair of depending apertured lugs 42, rigid therewith, having a pivotal sliding connection at 43 with a vertically swingable lever 44, having its lower end pivoted at 45 to the horizontal base 11. A horizontal hydraulic or pneumatic cylinder 46 is rigidly mounted upon the adjacent upright frame member 13, and operatively connected with the lever 44 as indicated at 47. Extension or retraction of the cylinder 46 causes the lever 44 to swing upon its pivot 45 for reciprocating the pusher plate 41 horizontally. The pusher plate 41 is movable beneath the lower edge 48 of the end wall 21 of the pallet rack, and when the pusher plate 41 moves inwardly toward the mold box, the lowermost pallet 40 in the stack of pallets is fed into the mold box longitudinally. The mold box sides 27 are provided near their lower ends and in their inner faces with parallel longitudinal grooves 49, slidably receiving the opposite longitudinal edge portions of each pallet 40, as the latter is fed into the mold box by the reciprocatory pusher plate 41. Once the pallet 40 has been fed into the mold box, it is bodily supported within the grooves 49 of the mold box sides.

Each pallet 40 is formed to provide a plurality of spaced openings 49' and 50 therein for the reception of the core sections 37 and the core end walls 36, when the mold core 34 is elevated, subsequent to the positioning of each pallet between the sides 27 of the mold box. A vertically shiftable pallet stop 51 is mounted upon the frame 10 adjacent to the discharge end of the mold box. This stop 51 is normally held elevated by a spring, not shown, contained within the stop mechanism, and the purpose of the stop is to properly position each pallet 40 within the mold box and to positively limit the endwise feeding of each pallet by the pusher plate 41. The stop 51 is retractable downwardly by means of a small air valve 52 during the time when a finished building block with its supporting pallet is being ejected from the mold box 26. The stop 51 and air valve 52 are bodily mounted upon one crossbar of the frame 10, as indicated in Figure 3.

The injection molding head 17, previously referred to, constitutes a fixed top wall or closure for the mold box 26. The molding head 17 has a plurality of openings 53' in communication with a corresponding number of injection nozzles 53, positioned to inject the moldable cement or like material into the space within the mold box surrounding the core parts 37 and 38. The injection nozzles 53 are connected at their upper ends with an injection or pressure device 54 of conventional construction, in turn communicating with a mixing device 55, receiving water in metered amounts through a pipe 56, connected with a suitable source of water. The mixing device 55 also receives the dry cement mix through an additional pipe 57, leading to and connected with a dry mixer 58 having inlet pipes 59 and 60 for dry cement and sand or other aggregate. The injection molding head 17 has a slot 53a formed therein for a horizontally reciprocatory valve plate 53b, having spaced openings 53c, adapted to register with the openings of the injection nozzles 53 in one adjusted position of the valve plate. In the other adjusted position of the valve plate 53b, the openings 53c are out of registration with the nozzles and the lower ends of the same are closed, as shown in Figure 10. The valve plate 53b is actuated by an air cylinder 53d or the like, rigidly mounted upon one end of the head 17 and connected with the valve plate through an upstanding portion 53e thereof, as shown.

The operation of the apparatus is as follows:

An adequate supply of the pallets 40 are placed within the rack 19, and the apparatus is set into operation. Conventional means are employed to control the timing of the various elements of the apparatus, and these means may be electrical, such as electrical motors, solenoids, limit switches and timers. It is believed to be unnecessary to a full understanding of the invention by those skilled in the art to show and describe in detail the electrical control means of the apparatus, as there are many ways of controlling the apparatus, all well-known and conventional.

A single attendant may, therefore, start the apparatus with a push button or the like, and when this is done, the conveyor belt 23 will begin to operate in the direction of the arrow, and the pneumatic or hydraulic cylinders 39 and 46, the pressure injection device 54 and valve plate 53b will likewise begin to operate in a continuous and automatically timed manner.

With particular reference to Figures 7 to 9 of the drawings, the beginning of the cycle of operation and the first step is clearly shown in Figure 7. The cylinder 46 is extended for swinging the lever 44 to the left, causing the pusher plate 41 to shift the lowermost pallet 40 in the stack of pallets from the rack 19 into the grooves 49 of the mold box sides 27. When this occurs, the mold core 34 is in the lowered or retracted position, and the stop 51 is elevated to limit the movement of the lowermost pallet 40 to the left. The valve plate 53b is now in the closed position, Figure 10.

As soon as the pallet 40 is properly positioned within the mold box 26, the cylinder 46 retracts and the pusher plate 41 is withdrawn to its outer position. Simultaneously, the cylinder 39 is extended for elevating the mold core 34, and the core parts 37 and core end walls 36 pass upwardly through the openings 49' and 50 of the pallet 40. Continued upward movement of the mold core 34 under the influence of the cylinder 39 causes the bottom wall 35 of the mold core to engage the bottom of the pallet 40 within the mold box 26 and force the same with the mold box sides 27 upwardly toward the stationary injection molding head 17. When this occurs, due to the engagement of the pins 33 within the diagonal slots 32 of the mold box sides 27, the latter are shifted upwardly slightly and also laterally inwardly toward each other. The springs 30 yield at this time to permit the desired upward and inward movement of the mold box sides. The upper edges of the mold box sides 27 will now engage tightly with the underside of the injection molding head 17, and the inner faces of the sides 27 will tightly grip the end walls 36 of the mold core 34.

When the above condition is achieved, the valve plate 53b automatically opens, uncovering the injection nozzles 53, and the moldable cement mix or similar material is injected under pressure by the pressure device 54 through the nozzles 53 and into the mold box space surrounding the core parts 37 and 38. The mold box becomes quickly filled with the moldable material, and as soon as this occurs, the valve plate 53b closes automatically, and stops the further injection of the moldable material into the mold box 26. The above steps are clearly indicated in Figure 8 of the drawings.

As soon as the above injection molding operation is completed, as described, the cylinder 39 is automatically retracted for lowering the mold core 34 to its lower position as shown in Figure 9. Simultaneously with this, the cylinder 46 is again extended for causing the pusher plate 41 to feed another pallet 40 into the mold box 26. As this occurs, the pallet which is being fed into the mold box will engage the pallet already held therein and eject the same longitudinally from the left hand end of the mold box, Figure 1, and onto the moving conveyor belt 23. As shown in Figure 9, the stop 51 is automatically retracted downwardly and out of the path of the ejected pallet 40, so that the same may pass freely with the now completed building block which it carries onto the moving conveyor belt 23.

The conveyor belt 23 operates continuously during the cycle of operation of the apparatus, and at a speed which will convey the ejected pallets and completed building blocks away from the mold box 26 somewhat faster than the pusher plate 41 feeds the pallets into the mold box. The stop 51 is urged upwardly toward its normal or active position by a spring, not shown, contained within the valve means 52. Due to the increased speed of the belt 23, and the action of the spring on the stop 51, the latter will have returned to its upper active position before the next succeeding pallet 40 from the bottom of the stack has been fully fed into the mold box 26 by the pusher plate 41.

The parts of the apparatus have by this time returned to their relative positions shown in Figure 7, and the cycle of operation is repeated for the desired number of times, and may be continuous. In order for the apparatus to operate continuously, it is only necessary that the attendant maintain an adequate supply of the pallets 40 within the rack 19, and see to it that a continuous supply of cement and aggregates are fed to the dry mixer 58, and that an adequate supply of water passes to the mixer 55 through the pipe 56.

The conveyor belt 23 will convey the finished building blocks and their supporting pallets to the desired curing area, and it is unnecessary for laborers to handle and rack the blocks in the usual manner.

Although the apparatus has been illustrated and described so as to manufacture one building block at a time in a continuous and automatic manner, it is fully within the scope of the invention to make two or more of the building blocks simultaneously. To do this, it is merely necessary to duplicate the injection molding means, the mold box and associated core 34, and to provide additional stacks of the pallets 40 to be fed into the mold boxes in the identical manner above-described in connection with the manufacturing of one building block at a time. Where multiple building blocks are made simultaneously, the conveyor belt 23 may merely be made wide enough to accommodate several blocks and pallets in side-by-side relation, or separate belts 23 may be provided in side-by-side relation.

Building blocks made in accordance with the use of the pressure injection means shown and described are superior in quality of building blocks manufactured by conventional manual or semi-automatic means. The building blocks made in accordance with the present invention are of uniform density and free of all external defects and internal cavities. The blocks have smooth finished surfaces, characteristic of the surfaces of articles made by pressure or injection molding. The blocks may be manufactured in a very rapid and highly efficient manner, and with substantially no manual labor, as explained.

It is to be understood that the form of the invention herewith shown and described is to be taken as a preferred example of the same, and that various changes in the shape, size and arrangement of apparatus parts may be restored to, and various changes in the order or sequence of steps may be made, without departing from the spirit of the invention or scope of the subjoined claims.

Having thus described our invention, we claim:

1. Apparatus for manufacturing building blocks and the like comprising supporting means, a mold box mounted upon the supporting means and including a pair of mold box sides and having open ends and an open bottom, said sides having diagonal openings formed therein, elements fixed to the supporting means and engaging within the diagonal openings of said sides so that vertical movement of the sides relative to the supporting means will cause the sides to shift laterally, resilient means interconnecting the sides and supporting means and normally holding the sides in lowered positions relative to the supporting means, said sides having grooves formed in their inner faces near their lower edges, an injection molding head fixedly mounted upon the supporting means above said sides and spaced somewhat from the tops of the sides when the latter are in their lowered positions, a pallet having spaced openings, means to shift the pallet into engagement with the grooves of said sides and to position the pallet in spaced opposed relation to the injection molding head, a mold core arranged between said sides of the mold box and normally disposed below the sides and said pallet, said mold core including a bottom wall, end walls and intermediate spaced core sections, and means to shift the mold core upwardly through the openings of the pallet and into engagement with the bottom of the pallet and to further elevate the mold core with the pallet so that the pallet will shift the sides upwardly and laterally inwardly, said sides then having their inner faces contacting opposite sides of the mold core and their upper edges engaging the bottom of the injection molding head, said pallet openings receiving the end walls and core sections of the mold core.

2. Apparatus for manufacturing building blocks comprising a supporting frame, a mold box mounted upon the supporting frame and including a pair of mold box sides and having open ends and an open bottom, said sides having recess means formed in their inner faces near their lower edges, means interconnecting the mold box sides and frame so that upward movement of the mold box sides relative to the frame causes the mold box sides to shift laterally toward each other, resilient means interconnecting the mold box sides and frame and serving to normally hold the mold box sides in lowered relatively separated positions, moldable material injection means fixedly mounted upon said frame above the tops of the mold box sides and spaced somewhat therefrom when the mold box sides are in their lowered positions, a mold core positioned between the mold box sides and disposed normally below the bottoms of said sides, and including a bottom wall, end walls and intermediate spaced core sections, reciprocatory means to elevate and lower the mold core relative to the mold box sides and said injection means, and pallet feeding means arranged beyond corresponding ends of the mold box sides for feeding pallets between said sides and into interlocking engagement with said recess means, elevating of the mold core while a pallet is interlocked with the recess means of said sides causing the pallet to elevate said sides and shift them laterally inwardly toward each other, the mold box sides then having their upper edges contacting said injection means and their inner faces contacting opposite sides of the mold core, said pallet having opening means to receive the end walls and spaced core sections of the mold core.

3. Apparatus for manufacturing building blocks comprising supporting means, a mold box mounted upon the supporting means and including a pair of mold box sides and having open ends and an open bottom, said mold box sides adapted for limited vertical movement and limited movement toward and from each other, cam means interconnecting said sides and supporting means for causing movement of the sides toward and from each other when the sides are elevated and lowered, an injection molding head mounted upon the supporting means above said sides, pressure injection means including valve means carried by said head for controlling the injection of moldable material into a mold cavity between said sides, said sides having recess means in their inner faces near their lower edges, a pallet mounted upon the supporting means near corresponding ends of said sides and having openings, a reciprocatory device engaging the supporting means and operable to shift the pallet edgewise between said sides and into interlocking engagement with the recess means, a mold core positioned between said sides and below the same and including a bottom wall, end walls and spaced intermediate core sections, and means to elevate and lower the mold core, whereby the mold core when shifted upwardly through the opening means of said pallet will engage and elevate the pallet with the mold box sides and the cam means will effect the shifting together of said sides and engagement thereof with opposite sides of the mold core, said sides then having their upper edges engaging the injection molding head.

4. Apparatus for manufacturing building blocks in accordance with claim 3, and resilient means interconnecting said sides and supporting means and yieldably holding the sides in lowered positions with their upper edges out of contact with the injection molding head and their inner faces out of contact with the sides of the mold core.

5. Apparatus for making building blocks comprising supporting means, a mold box mounted upon the supporting means and including a pair of mold box sides and having open ends and an open bottom, said mold box sides adapted to have limited vertical and lateral movement, cam means interconnecting said sides and supporting means and causing the sides to shift toward each other and to separate when the sides are elevated and lowered vertically, an injection molding head mounted upon the supporting means above said sides and fixed relative to the supporting means, valve means for said head to control the injection of moldable material into the mold box, a pallet rack mounted upon the supporting means beyond corresponding ends of said sides, said sides having recess means in their inner faces and near their lower edges, a stack of pallets held within the pallet rack, a pallet pusher plate slidably engaging the supporting means and adapted to engage the lowermost pallet of the stack of pallets, means to shift the pallet pusher plate toward the mold box sides for feeding the lowermost pallet between the sides and into interlocking engagement with the recess means of the sides, movable stop means mounted upon the supporting means to limit the feeding of said pallet by the pallet pusher plate, a mold core arranged below and between the mold box sides and including a bottom wall, end walls, and intermediate spaced core sections, means to shift the mold core upwardly between said sides and into engagement with the pallet, the pallet having opening means to receive the mold core, continued upward movement of the mold core shifting the pallet upwardly and causing said sides to shift inwardly toward each other due to the action of said cam means, and conveyor means mounted adjacent the ends of said sides remote from the pallet rack and arranged substantially at the elevation of said lowermost pallet and adapted to convey the pallet from the mold box with a finished building block thereon when a second pallet is fed into the mold box by said pusher plate to thereby eject the first pallet from the mold box.

References Cited in the file of this patent

UNITED STATES PATENTS

| 700,746 | Davies | May 27, 1902 |
| 779,976 | Sterling | Jan. 10, 1905 |
| 798,306 | Stringer | Aug. 29, 1905 |
| 1,111,736 | Conkling | Sept. 29, 1914 |
| 1,340,824 | Crozier | May 18, 1920 |
| 1,695,327 | Goldston | Dec. 18, 1928 |
| 2,578,105 | Taylor | Dec. 11, 1951 |
| 2,615,228 | Regan | Oct. 28, 1952 |
| 2,875,499 | Ross | Mar. 3, 1959 |

FOREIGN PATENTS

| 149,228 | Australia | Nov. 28, 1952 |